United States Patent [19]

Ansaloni

[11] Patent Number: 5,971,037
[45] Date of Patent: Oct. 26, 1999

[54] METHOD OF CONTROLLING THE WEIGHT OF GRANULATED PRODUCTS ON MULTIPLE METERING MACHINES, AND METERING MACHINE IMPLEMENTING SUCH A METHOD

[75] Inventor: Angelo Ansaloni, Crespellano, Italy

[73] Assignee: MG2 S.p.A., Pianoro, Italy

[21] Appl. No.: 08/808,995

[22] Filed: Mar. 3, 1997

[30] Foreign Application Priority Data

Mar. 4, 1996 [IT] Italy ................................ BO96A0102

[51] Int. Cl.⁶ ........................................ B65B 1/30
[52] U.S. Cl. .................................. 141/83; 141/2; 141/9; 141/21; 141/65; 141/67; 141/129; 141/100; 141/101; 141/103; 141/145; 141/237; 141/238; 141/242; 177/70
[58] Field of Search ........................... 141/1, 2, 9, 21, 141/65, 66, 67, 70, 83, 85, 95, 129, 145, 100, 101, 103, 107, 237, 238, 242, 244; 177/70, 116

[56] References Cited

U.S. PATENT DOCUMENTS

| | | | |
|---|---|---|---|
| 4,537,229 | 8/1985 | Sashiki et al. | 141/83 |
| 4,635,688 | 1/1987 | Graffin | 141/83 |
| 4,662,409 | 5/1987 | Egli | 141/1 |
| 4,867,258 | 9/1989 | Narukawa et al. | 177/116 |

*Primary Examiner*—Henry J. Recla
*Assistant Examiner*—Timothy L. Maust
*Attorney, Agent, or Firm*—Finnegan, Henderson, Farabow, Garrett & Dunner, L.L.P.

[57] ABSTRACT

A method of controlling the weight of granulated products on a multiple metering machine; the method operating on a machine performing a metering cycle in which at least two products are metered into a container; and the method including: a step wherein the dosage of each product is formed in a chamber; at least one step wherein one of the metered products is transferred from the chamber to the container; at least one step wherein one of the metered products is extracted from the chamber; and a step wherein the products inside the container are weighed at the end of the metering cycle.

11 Claims, 4 Drawing Sheets

METHOD OF CONTROLLING THE WEIGHT OF GRANULATED PRODUCTS ON MULTIPLE METERING MACHINES, AND METERING MACHINE IMPLEMENTING SUCH A METHOD

BACKGROUND OF THE INVENTION

The present invention relates to a method of controlling the weight of granulated (delayed-action) products on a machine for metering such products into containers.

The present invention also relates to a metering machine implementing the above method.

The method according to the present invention may be used to an advantage on metering machines for metering a number of granulated products into hard-gel capsules, to which the following description refers purely by way of example.

As is known, one of the biggest problems on such machines is controlling the weight of the dosage of each product.

One solution currently adopted on multiple metering machines for successively metering a number of different products into one capsule consists in removing from the machine and weighing a specimen capsule of known tare into which only one of the products involved in the metering process has been dispensed.

The above solution involves several drawbacks. In particular, the various granulated products are weighed with the machine idle, which, as each single product and each single metering member must be controlled, therefore results in considerable downtime. Moreover, all the above operations must be repeated for each change in the metered products, for each variation in the amount of product to be metered, and at any rate at predetermined intervals to compensate for any variation in the parameters, on or off the machine, affecting the metering cycle. In addition to the complex nature and the time required to perform the weighing operations, the possibility also exists of a container subjected to the above operations, and therefore containing only one product, being mistaken for and packed with those containing all the metered products.

A second solution enabling control during normal operation of two-product metering machines involves two weighing methods: a first for controlling the weight of the first product, which, after it is metered out, and before metering out the second product, is removed from the capsule by opening the bottom of the capsule and collecting the product which falls out by force of gravity, and is sent to a weighing station; and a second for controlling the weight of the second product, which is calculated by subtracting from the weight of a capsule of known tare, and containing both products, the tare of the capsule and the weight of the first product.

A major drawback of this second solution is that it is limited to machines metering at most two different products. Moreover, when the capsule is opened to extract the first product, fragments of the capsule may also be collected together with the product, thus seriously impairing the accuracy of the weighing operation.

SUMMARY OF THE INVENTION

It is an object of the present invention to provide a method of controlling the weight of granulated products on a multiple metering machine, designed to overcome the aforementioned drawbacks.

It is a further object of the present invention to provide a granulated product metering machine implementing the above method.

According to the present invention, there is provided a method of controlling the weight of granulated products on a multiple metering machine, the method operating on a machine performing a metering cycle in which at least two products are metered into a number of containers, and the method comprising:

a step wherein the dosage of each product is formed in a chamber; and at least one step wherein one of said metered products is transferred from said chamber to one of said containers;

characterized by comprising, during normal operation of said machine:

at least one step wherein one of said metered products is extracted from said chamber and sent to a storage station by means of a product extracting device; and a step wherein, at the end of said metering cycle, said products inside said container are weighed at a weighing station.

According to the present invention, there is also provided a multiple metering machine for metering granulated products, and comprising a metering station for metering at least two granulated products into containers and in turn comprising at least one chamber for forming the dosage of said products; characterized by comprising:

a product extracting device for extracting a first of said products from said chamber following said dosage formation; and a weighing station for controlling the weight of said products inside one of said containers.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
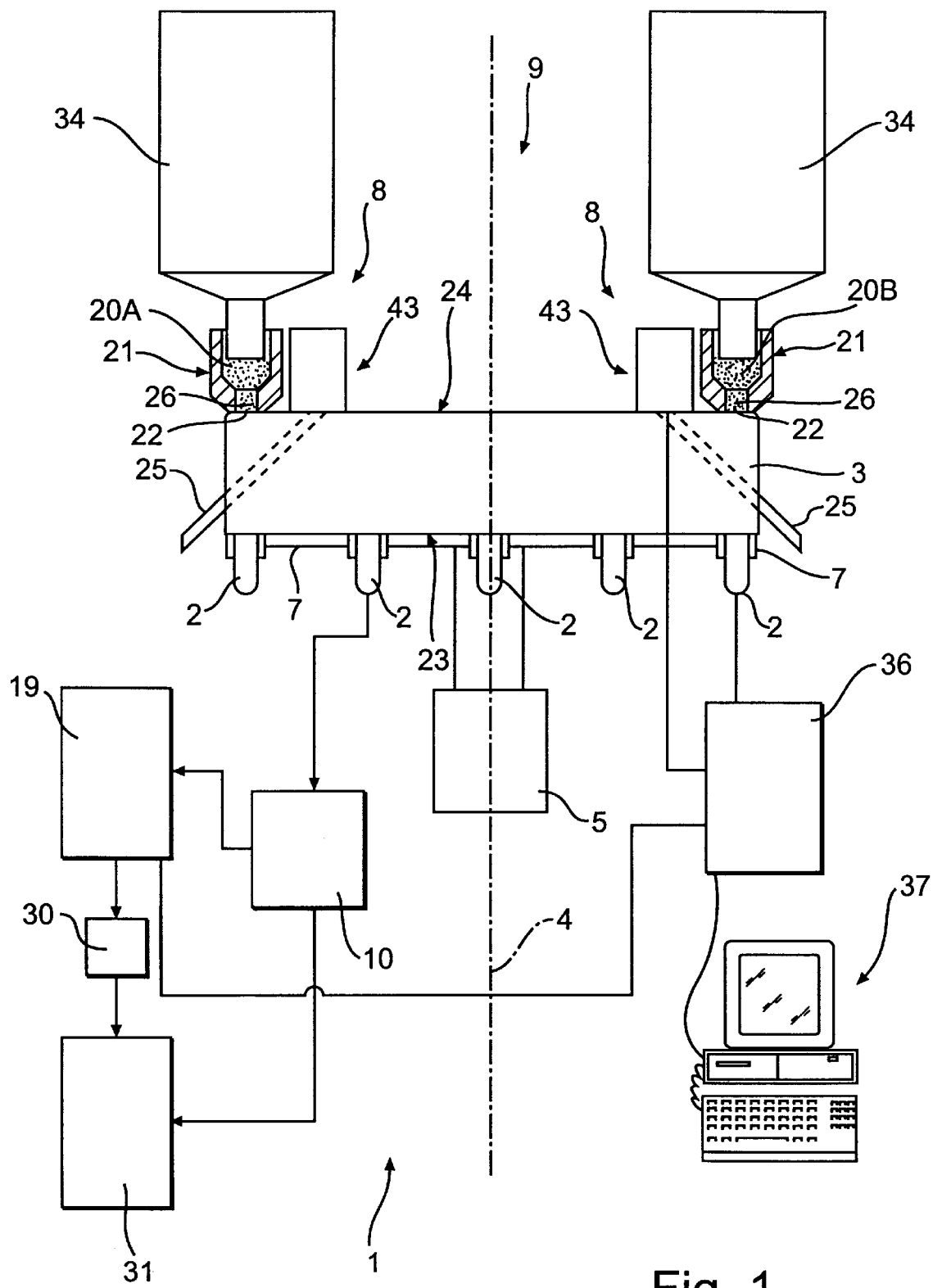
FIG. 1 shows a partially sectioned front view of a machine in accordance with the teachings of the present invention.

Number 1 in FIG. 1 indicates a machine for successively metering a number of granulated (so-called delayed-action) products, for example, product 20A and product 20B, as shown in FIG. 1, into the bottom shells 2 of hard-gel capsules. For the sake of the simplicity, products 20A and 20B are referred to generically as products 20 in the discussion below. It should be understood that the machine is not limited to only two products.

Machine 1 comprises:

a known metering station 9 for metering products 20 into shells 2;

product extracting devices 8 for extracting from metering station 9 the metered products 20 not yet fed into shells 2;

a known weighing station 19 comprising at least one scale and for controlling the weight of products 20 in shells 2;

a known controlled-product storage station 31 for storing shells 2 and controlled products 20;

known transfer means 30 for transferring shells 2 and controlled products 20 from weighing station 19 to controlled-product storage station 31;

known conveying means 7 for conveying shells 2 along the system of which machine 1 forms part, and for conveying shells 2 in side machine 1;

known capsule extracting means 10 for extracting shells 2 from conveying means 7 and feeding the extracted shells 2 to weighing station 19 or to controlled-product storage station 31; and an electronic central control unit 36 to which is connected a terminal 37, possibly connected to a network (not shown), for displaying production data and programming production, e.g. defining the operating cycles of machine 1, the amount of products 20 to be metered, the weighing mode of products 20, etc.

One embodiment of conveying means 7 comprises a belt fitted with bushings for supporting shells 2. Another embodiment comprises cylindrical drums with lateral surface seats for shells 2; and pneumatic means for retaining shells 2 inside the seats.

Metering station 9 comprises:

a cylindrical drum 3 rotated about a respective vertical longitudinal axis 4 by drive means 5 controlled by central control unit 36, and having a top face 24 and a bottom face 23; said conveying means 7 supporting shells 2 with the top edges substantially contacting bottom face 23; and fixed metering bodies 21 for metering products 2 from feedboxes 34.

Figure 2:
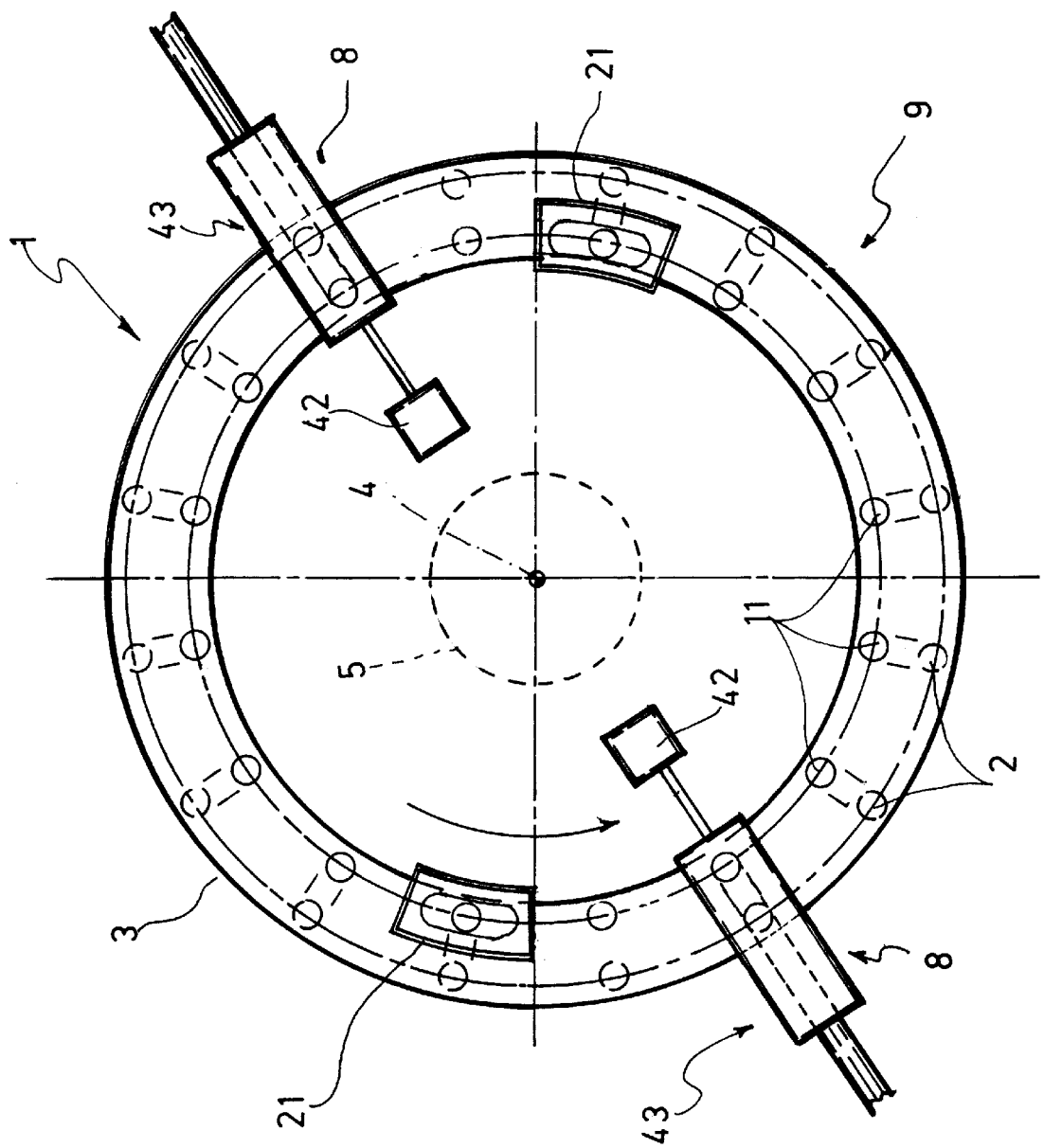
FIG. 2 shows a plan view, with a number of parts removed, of the FIG. 1 machine.
Figure 3:
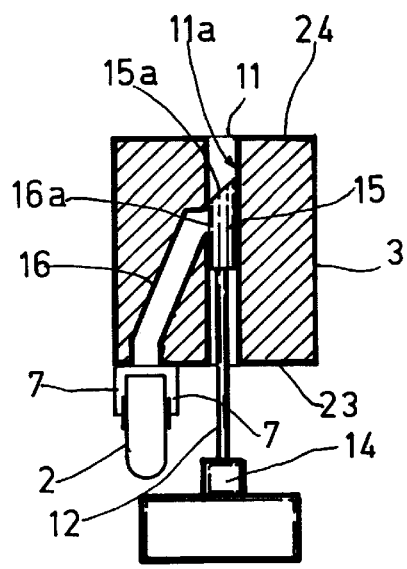
FIGS. 3, 4, 5, 6 show partially sectioned views of a FIG. 1 detail at various stages in the operating cycle.

With reference to FIGS. 2 and 3, about one peripheral edge, cylindrical drum 3 comprises a number of equally spaced cylindrical through holes 11 parallel to axis 4, extending from top face 24 to bottom face 23 of drum 3, and along each of which slides axially a pin 12 driven by a motor 13 controlled by central control unit 36, and which comprises a sensor 14 (normally an encoder) connected to central control unit 36 and for determining the axial position of pin 12. Pin 12 also comprises a head 15 of substantially the same outside diameter as hole 11 so as to define a substantially airtight fit between head 15 and the inside wall of hole 11; head 15 comprises a tapered top end having a top face 15a defined by an inclined surface; and each hole 11 comprises an opening 16a from which extends a conduit 16 terminating at bottom face 23 of drum 3 and coaxially with a respective shell 2 underneath.

Figure 4:
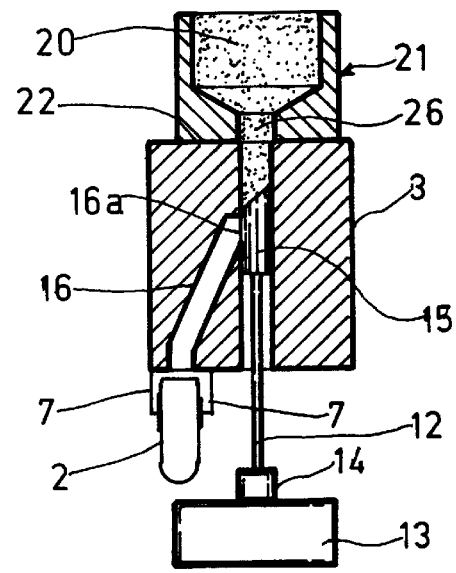
Figure 5:
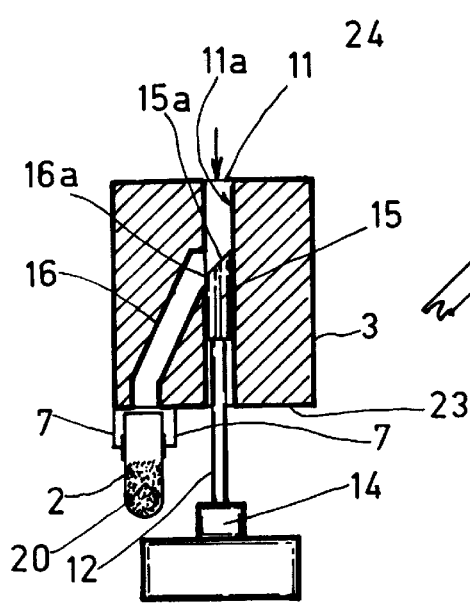

With reference to FIGS. 3, 4, 5, as drum 3 rotates, pin 12 performs an operating cycle in which it is moved from a first position—wherein, for a given time, face 15a of head 15 is located above and closes opening 16a, and a chamber 11a is defined at the top of hole 11 and filled, in use, with a quantity of granules—to a second position, subsequent to chamber 11a being filled—wherein, for a given time, face 15a of head 15 is located slightly below opening 16a, and the granules filling chamber 11a flow by force of gravity, and with the aid of inclined surface 15a, from chamber 11a into conduit 16, and from conduit 16 into respective shell 2. In the first position, the distance between head 15 and the top face of drum 3 determines the length of chamber 11a and therefore the amount of granules filling the chamber; and, from the second position, pin 12 is first moved upwards so that the end of head 15 projects from hole 11 to expel any leftover granules from chamber 11a, and then back downwards into the first position. Pins 12 all perform the above operating cycle once for each product to be metered into shells 2. For example, machine 1 in the example shown provides for metering two products 20 (referred to as 20A and 20B for the sake of simplicity) into the same shell 2, so that each pin 12 performs two of the above operating cycles for each complete turn of drum 3. In FIGS. 3 through 5, it should be understood that reference number 20 is generically used to refer to any of the plurality of products.

With reference to FIGS. 1, 2 and 4, for each product to be metered, machine 1 comprises a fixed, cup-shaped metering body 21, the longitudinal axis of which describes an arc of a circle of the same diameter as the circumference defined by joining all the axes of holes 11. Metering body 21 is fitted directly on the top face 24 of drum 3, and comprises a bottom wall 22 in which is formed a through hole 26 with a longitudinal axis parallel to that of body 21, and of a width greater than the diameter of hole 11 underneath. Each metering body 21 is fitted beneath a respective feedbox 34 containing the product to be metered, and for supplying body 21 underneath. In actual use, as drum 3 rotates, holes 11 communicate successively, via hole 26, with a first metering body 21, which fills chamber 11a with a quantity of granules of product 20A, and, as the relative hole 11 travels from the first to the second body 21, the granules slide, as described above, into the shell 2 relative to said hole 11. Similarly, as said hole 11 travels from the second to the first body 21, the quantity of granules of product 20B fed into chamber 11a slides into shell 2 relative to hole 11.

Figure 6:
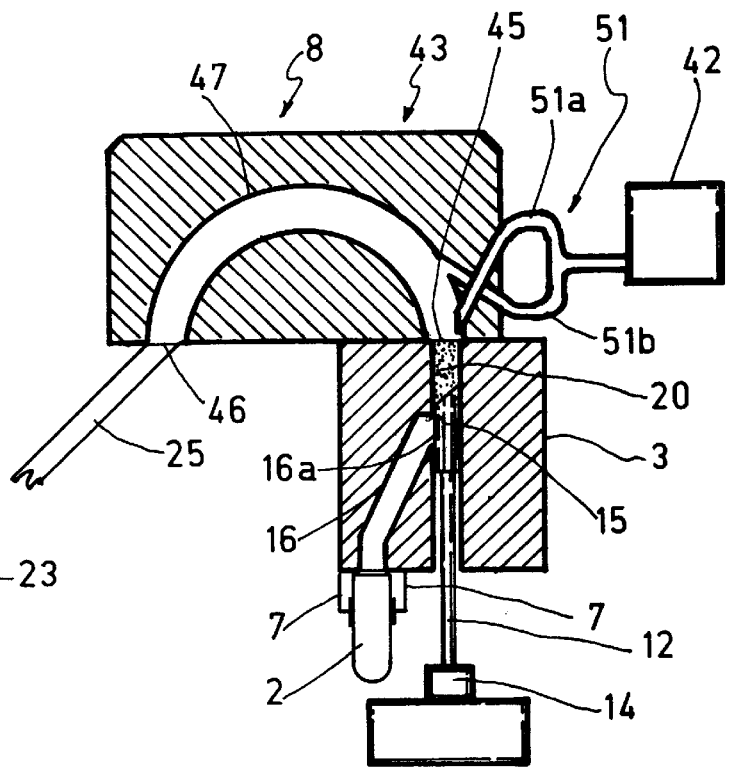

With reference to FIGS. 1, 2 and 6, product extracting device 8 is controlled by central control unit 36 so as to extract, at given stages, the quantity of granules in chamber 11a, and comprises, for each metering body 21, a fixed body 43 connected to a pneumatic system 42 communicating with a compressed air tank (not shown) and controlled by central control unit 36. Fixed body 43 is fitted on the top face 24 of drum 3, downstream from respective metering body 21, has a portion projecting beyond the peripheral edge of top face 24 of drum 3, and comprises an inner conduit 47 having a first opening 45, which, for a given time as drum 3 rotates, is positioned facing chamber 11a, and a second opening 46 formed in said projecting portion and from which extends a tube 25 for feeding the extracted granules to controlled-product storage station 31. Fixed body 43 comprises a tube 51 communicating at one end with the pneumatic system, and from the opposite end of which extend two diverging portions 51a and 51b, the first portion 51a facing inwards of chamber 11a, and the second portion 51b terminating in a central face of conduit 47.

In actual use, pneumatic system 42 feeds a jet of compressed air into tube 51, so that part of the jet travels along first portion 51a, and the rest along portion 51b; and the air directed into chamber 11a from first portion 51a blows the granules in the chamber partly up along conduit 47 where they encounter the air jet from second portion 51b, which blows the granules first along conduit 47 and then along tube 25 to controlled-product storage station 31.

Figure 7:
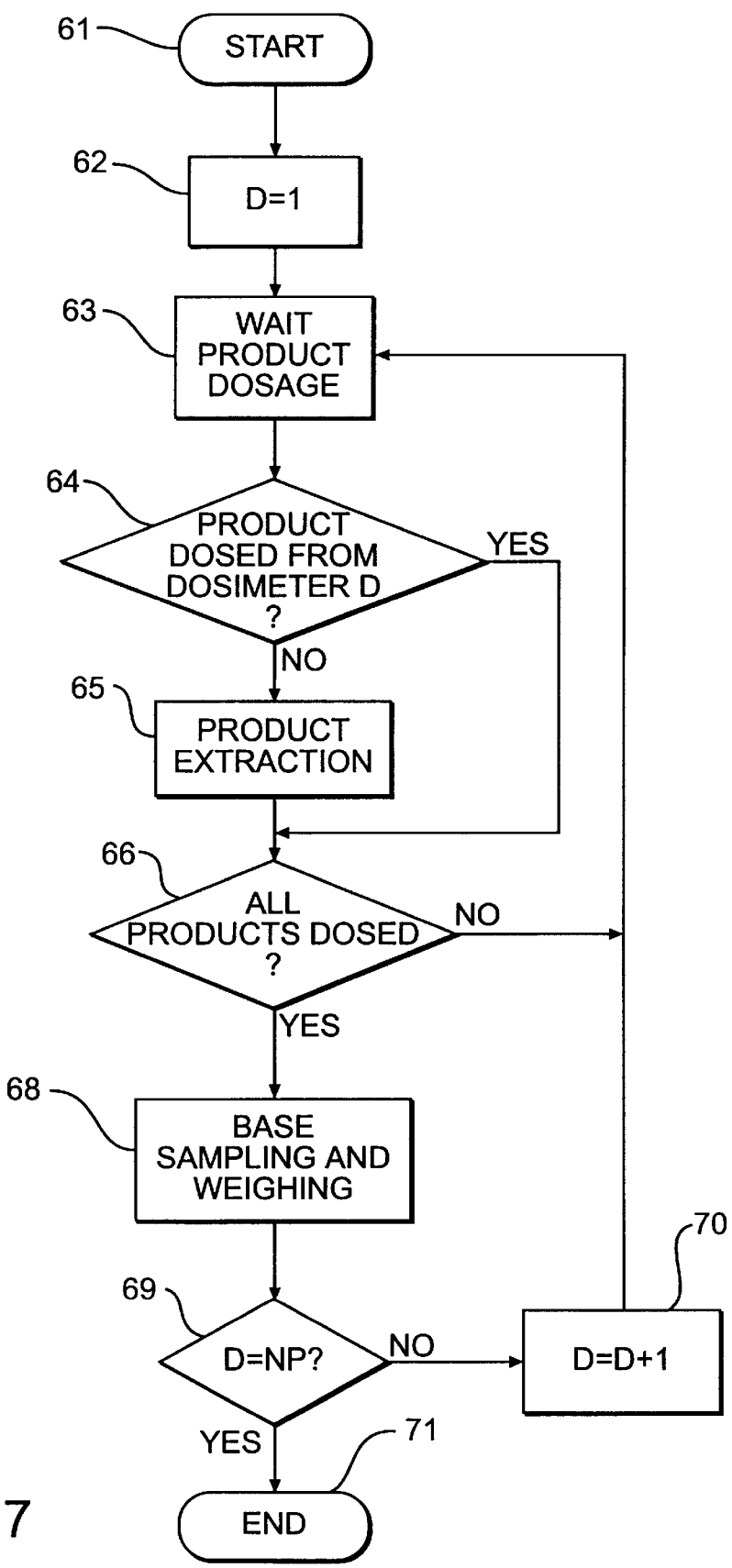
FIG. 7 shows a flow chart of a preferred embodiment of the method according to the present invention.

The operating cycle of the weight control method according to the present invention will now be described with reference to the flow chart in FIG. 7, which method is implemented during normal operation of metering machine 1, and involves, for each control cycle, one hole 11 and respective shell 2. More specifically, the control cycle (NP corresponds to the predetermined number of products) described provides for controlling the weight of NP products metered by NP metering bodies 21 into a shell 2 at one hole 11.

The control cycle commences from a cycle start block 61.

Block 61 goes on to a weight control start block 62, in which a register D indicating the metering body 21, and therefore the corresponding product 20 being controlled, is set to 1 (D=1) so that control commences from the first metering body 21.

Block 62 goes on to block 63, which waits for product 20 to be metered into chamber 11a of the controlled hole 11.

Block 63 goes on to block 64, which determines whether product 20 was metered by metering body 21; in the event of a positive response, block 64 goes on to block 66; conversely, block 64 goes on to block 65.

Block 65 prevents product 20 from being transferred from chamber 11a to shell 2; and, when hole 11 is located at fixed body 43 (of product extracting device 8) of metering body 21, product 20 is extracted from chamber 11a by product extracting device 8, and block 65 goes on to block 66.

Block 66 determines whether the controlled hole 11 has completed the metering cycle, i.e. has already passed beneath all the metering bodies 21; in the event of a positive response, block 66 goes on to block 68; conversely, block 66 goes back to block 63.

Block 68 provides, via capsule extracting means 10, for removing shell 2 corresponding to the controlled hole 11, and transferring it to weighing station 19. As shell 2 only contains the product 20 metered by metering body 21, the weight of product 20 is easily controlled, following which, shell 2 containing product is transferred by transfer means 30 to controlled-product storage station 31.

Block 68 goes on to a block 69, which determines whether the weight of all NP products 20 metered by NP metering bodies 21 has been controlled, i.e. whether D=NP; in the event of a positive response, block 69 goes on to block 71; conversely, block 69 goes on to block 70.

Block 70 prepares to control the weight of product 20 metered by the next metering body 21, i.e. sets register D to D+1, and then goes back to block 63.

Block 71 terminates the control cycle.

At weighing station 19, the weight of product 20 in shell 2 may be controlled in various ways. For example, by extracting product 20 and feeding it to a scale; or by weighing the product together with shell 2, if of known tare (because shell 2 is weighed prior to the metering cycle, or because the average weight of shell 2 is known); or by weighing shell 2 together with product 20, extracting product 20, and determining the tare by weighing the empty shell 2.

The above weighing operations are repeated several times for each hole, each time after a given number of normal operating cycles, so that, for each hole 11, central control unit 36 is supplied with a series of weight findings for each metered product 20, determines from all the findings a weighted average for each product 20 and each hole 11, and compares the weighted average with a predetermined value relative to the amount of product 20 to be metered into shell 2. Depending on the outcome of the comparison and on the finding of sensor 14, central control unit 36 provides for adjusting the travel of pin 12, and more specifically for adjusting the first position of the pin determining the amount of product 20 to be metered.

The advantages of the present invention will be clear from the foregoing description. In particular, the method according to the invention provides for controlling the weight of each product on a machine metering two or more products; for controlling weight during normal operation of the metering machine, thus requiring no stoppage of the machine; and, finally, for a high degree of accuracy in determining the weight of the metered product.

Clearly, changes may be made to the method and machine as described and illustrated herein without, however, departing from the scope of the present invention.

In particular, not only single products 20 but also a number of products 20 may be weighed simultaneously. For example, when metering three products 20 (referred to as first product 20A, second product 20B, and a third product for the sake of simplicity), weighing station 19 may be supplied with a capsule containing two products 20 (a first product and a second product, or a first product and a third product or a second product and a third product) of which the total weight is to be determined.

In another variation, weighing station 19 may be located along the path traveled by shells 2 on machine 1, in which case, the weight of the product inside the test shell 2 is determined by weighing and subtracting the tare of shell 2, and capsule extracting means 10 remove shell 2 following the weighing step, and supply shell 2 to controlled-product storage station 31.

I claim:

1. A multiple metering machine for metering granulated products, comprising:

a metering station for metering and dispensing at least two granulated products into containers, the station including at least one chamber for forming the dosage of said products;

a product extracting device for extracting a first of said products from said chamber following said dosage formation, without the extracted said first product being transferred to one of said containers; and a weighing station for controlling the weight of said products that have been dispensed inside one of said containers.

2. The metering machine as claimed in claim 1, further comprising a controlled-product storage station to which said product extracting device supplies the extracted said first product, and to which transfer means transfer the controlled said products and containers from said weighing station.

3. The metering machine as claimed in claim 1, wherein said metering station further comprises:

a main body including a top face and a bottom face;

a plurality of cylindrical through holes extending from said top face and terminating in said bottom face;

a pin sliding axially along each of said holes and activated by a motor; said pin comprising a head, which has an upper surface defined by an inclined surface, and has an outside diameter substantially equal to the diameter of said hole, so as to form a chamber defined by said head and by the inner wall of said hole, and of a volume depending on the position of said pin along said hole; and a first conduit connected to said hole; said first conduit extending from an opening along said hole, and terminating in said bottom face coaxially with a respective first of said containers underneath;

said pin moving along said hole between a top position and a bottom position; in said top position, said chamber only communicating with said top face and containing, in use, a first of said products metered by a metering body; and, in said bottom position, said chamber also communicating with said bottom face via said first conduit to transfer said first product from said chamber to said container.

4. The metering machine as claimed in claim 3, wherein said product extracting device comprises a plurality of fixed bodies, each associated with a respective said metering body and in turn comprising:

a second conduit having a first opening facing, in use, said chamber, and a second discharge opening; and a tube communicating at one end with a pneumatic system, and from the opposite end of which extend two diverging portions; a first of said portions facing inwards of said chamber, and a second of said portions terminating in a central face of said second conduit;

said fixed body extracting said first product from said chamber, and feeding said first product along said second conduit by means of a compressed air jet fed along said tube.

5. A multiple metering machine for metering granulated products, comprising:

a metering station for metering and dispensing at least two granulated products into containers, the station including at least one chamber for forming the dosage of said products;

a product extracting device for extracting a first of said products from said chamber to a product storage station following said dosage formation;

a weighing station for controlling the weight of said products inside one of said containers; and extracting means for transferring said containers from said metering station to said weighing station.

6. A method of controlling the weight of granulated products on a multiple metering machine, the method operating on a machine performing a metering cycle in which at least two products are metered and dispensed into a number of containers, the method comprising:

a step wherein the dosage of each product is formed in a chamber;

at least one step wherein one of said metered products is transferred from said chamber to one of said containers;

at least one step during normal operation of said machine wherein one of said metered products is extracted from said chamber and sent to a storage station by means of a product extracting device, without being transferred to one of said containers; and a step wherein, at the end of said metering cycle, said products inside said container are weighed at a weighing station.

7. The method as claimed in claim 6, wherein said step wherein said products inside said container are weighed is performed at said weighing station, after said products are extracted from said container.

8. The method as claimed in claim 6, wherein said step wherein said products inside said container are weighed is performed at said weighing station by weighing said container when full, and by subtracting from the result of said weighing operation the tare of said container.

9. The method as claimed in claim 6, wherein said step wherein said products inside said container are weighed is performed at said weighing station by determining a first weight of said container when full, extracting said products from said container, determining a second weight of said container when empty to determine the tare, and subtracting said tare from said first weight.

10. The method as claimed in claim 6, wherein said weighing step also comprises statistical processing of the weights of the quantities of each of said metered products in said containers; said processing comprising forming the weights of the quantities of each of said metered products into a respective data set, and determining, in time and for each set, whether the product quantities are outside a predetermined tolerance range.

11. The method as claimed in claim 10, comprising an intervention step to automatically adjust the quantities of each of said metered products.

* * * * *